United States Patent [19]

Grisé et al.

[11] 4,184,422
[45] Jan. 22, 1980

[54] MIXING MATERIAL IN SEALED CONTAINERS

[76] Inventors: Frederick G. J. Grisé, 87 Main St., Osterville, Mass. 02655; Walter Lovell, 348 Mountain Rd., Wilbraham, Mass. 01095

[21] Appl. No.: 959,484

[22] Filed: Nov. 13, 1978

Related U.S. Application Data

[60] Continuation-in-part of Ser. No. 677,450, May 15, 1976, abandoned, which is a division of Ser. No. 183,118, Sep. 23, 1971, abandoned.

[51] Int. Cl.² .................. H23L 1/32; B01F 7/16
[52] U.S. Cl. .................................. 99/485; 366/348
[58] Field of Search ............... 366/348, 197; 99/485, 99/646 R; 416/31, 71

[56] References Cited

U.S. PATENT DOCUMENTS

| | | | |
|---|---|---|---|
| 2,316,861 | 4/1943 | Hansen | 416/71 X |
| 2,676,631 | 4/1954 | Wood | 99/646 R |
| 2,760,763 | 8/1956 | Harper | 99/485 |
| 3,320,987 | 5/1967 | Pelzel | 99/646 R |

*Primary Examiner*—Edward J. McCarthy
*Attorney, Agent, or Firm*—Charles R. Fay

[57] ABSTRACT

Mixing or homogenizing an avian egg by piercing the egg at its smaller end with a relatively small upwardly pointing needle while holding the egg in the hand, said needle having an offset portion, and then rapidly rotating the needle so that said offset portion is inside the egg and acts as a beater.

3 Claims, 5 Drawing Figures

U.S. Patent  Jan. 22, 1980  4,184,422
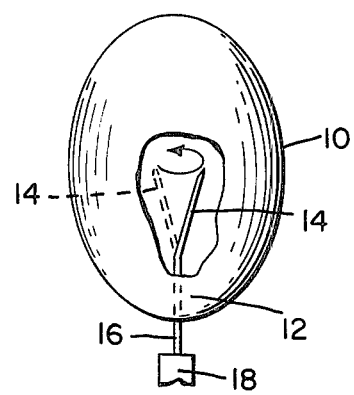
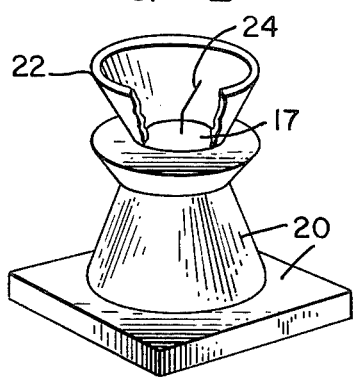
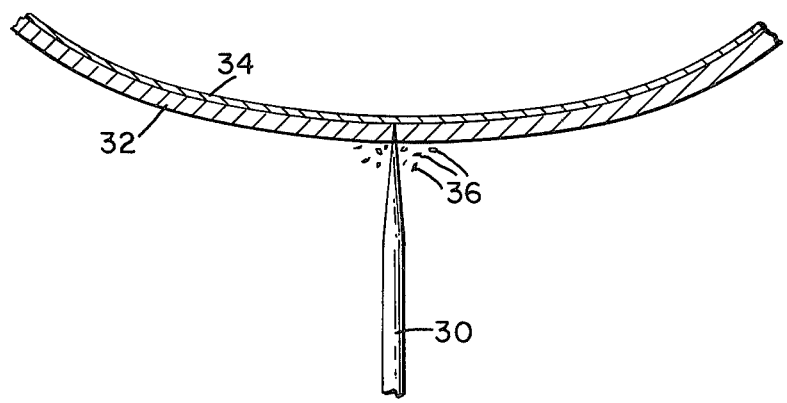

MIXING MATERIAL IN SEALED CONTAINERS

This application is a continuation in part of Ser. No. 677,450 filed May 15, 1976, now abandoned, which was a divison of Ser. No. 183,118 filed Sept. 23, 1971, now abandoned.

BACKGROUND OF THE INVENTION

It is well-known that it would be advantageous to thoroughly mix materials inside of a sealed container as for instance in the case of eggs. If it were possible to beat the egg, yold and white together, into a uniform substance inside the egg, the egg could then be much more easily used to make scrambled eggs, omelettes, and bakery products in general without the necessity of beating or whipping them. In addition hard boiled eggs would be substantially homogenized and of uniform color and texture throughout.

This has been proposed heretofore as in U.S. Pat. No. 2,316,861, but as disclosed in that patent the operation is inoperative. That patent shows a three element beater including a straight needle with a relatively large spear head, a pair of side springs, and a hollow shank to contain the same. This arrangement has been found to require a diameter greater than 0.060", e.g. ⅛", and this size of penetrating element necessarily breaks the shell, as clearly stated in the patent. If the shell breaks, pieces of shell enter the egg and/or the egg runs out the hole.

Similar objections apply to U.S. Pat. No. 2,760,763, Aug. 28, 1956, where the egg is held in a fixed position and the needle is mechanically brought down onto the egg.

SUMMARY OF THE INVENTION

A machine having a motor in a base and an upwardly directed bent needle or the like to be rotated by the motor is provided to carry out the present method. The egg is held in the hand with the small end exposed, and the egg is manually pressed to pierce the small end thrusting the bent needle into the egg. It is preferred that the needle should project sufficiently at the start into the egg to penetrate the yolk.

The needle will have a short projecting portion which may be utilized to be rapidly rotated by any kind of apparatus and the offset or bent portion of the needle will then act as a beater e.g., inside of the egg shell; and in a matter of a few seconds the material in the egg is completely mixed into an homogenized state if desired depending in part upon the degree of rapidity of rotation of the needle.

Upon withdrawing the needle a drop of sealing material can be placed at the very minute hole left by the needle but in many cases this is not even necessary as the beaten or homogenized egg fluid will not flow through a hole approximately 0.020" which is the preferred size of the needle. The present inventors have found that the largest possible hole in the shell, for practical operation is no greater than 0.060", but at this size vibration is necessary and the treated egg cannot be boiled properly as it leaks.

At approximately 0.045" opening, the shell will not break if great care is taken, and the process is practicable, but some egg will leak.

At approximately 0.020", the process is perfected, and no egg can be lost, as at this small size the egg membrane automatically seals the hole, in addition, as the 0.020" needle is withdrawn from the egg, this membrance wipes and cleans it.

BRIEF DESCRIPTION OF THE DRAWINGS

FIG. 1 is a diagrammatic view illustrating the invention;

FIG. 2 is a perspective partly broken away showing a device for carrying out the beating of the eggs;

FIGS. 3 and 4 show modified needles; and

FIG. 5 is an enlarged view of the needle piercing the egg.

PREFERRED EMBODIMENT OF THE INVENTION

In FIG. 1, an egg has been pierced, at the bottom, by a needle 12. This needle is small enough in diameter to fail to break or chip the shell, and it has a bent portion 14 and an axial portion 16 adapted to be rotated as by the chuck 18 of an electric motor.

Instead of the bent portion 14, the needle may be curved, FIG. 3, or sinuous, FIG. 4.

The egg to be processed is taken in hand with smaller end exposed, the larger end which has the air sack toward the palm. The egg is thus manually advanced to the sharp end of the needle 24 in a downward direction. It has been found to be better to move the egg by the hand with the longer axis of the egg parallel to the bent portion of the needle, but once the needle is embedded, to its full length, it does not matter whether the egg is upright with its longer axis vertical. The axial portion of the needle as at 16 must be through the shell, FIG. 1, because if the needle rotates with any part of the bent portion 14 exposed or in the shell, rotation of the needle shatters the shell and the contents will run out. In fact, the needle, of whatever shape, being thrust into the egg and the egg moves enough to accept it, the egg will not break or chip if the needle is 0.060" in diameter or less. It has been explained above that about 0.020" needle is optimum, but the important consideration is that a single element penetrant is used in this invention.

In any event, as soon as the penetration has taken place, with the smaller end of the egg abutting a fixed member 17 through which the needle projects, the needle is rapidly rotated, and the egg is beaten, mixed, or homogenized in seconds.

A simple device for accomplishing this is shown in FIG. 2. A base and housing 20 for a motor, not shown, has an upstanding collar 22 and the bent needle 24 extends up within the collar. A switch not shown is acivated e.g. by hand. The egg can be moved laterally in the collar to cause the needle to penetrate the shell smoothly, see FIG. 1, and as soon as the switch, not shown, is activated the needle is rapidly rotated. In a very few seconds the mixing is completed, and the egg can be withdrawn, with a drip, or a very small amount.

FIG. 5 shows the needle 30 puncturing the shell 32. The membrane is illustrated at 34, and it seals the hole made by the needle after withdrawal under certain circumstances. If there are any small chips 36 from the shell, they all remain outside the shell and are not able to penetrate it under any usual circumstance.

The reason why the material in the container is so quickly homogenized is that a vortex is formed, FIG. 1, that feeds the material to its apex and there is nowhere for the beaten material to go but reversely along the sides of the container back to the vortex.

I claim:

1. The method of homogenizing an avian egg having an ovoid shape with a larger end and a smaller end, there being an air cell in the larger end, said egg having an interior membrane under the shell, said membrane encompassing the fluid content of the egg, and failing to enter the air cell, the step of piercing a wall of the egg shell and the membrane by means of a single bent needle, by holding the egg in one hand of the user, said egg being partly exposed, the remainder of the egg being toward the palm of the hand, and pressing the egg down against the point of the needle held upright with its point up, and sliding the egg down on the needle all the way to the end of the needle so that the entire needle is within the egg and at least partially within the yolk, and rapidly rotating the needle while the egg is held in the hand until the egg is homogenized.

2. The method of claim 1 wherein the needle has a degree of flexibility and including the step of holding the needle while applying the egg thereto.

3. The method of homogenizing an avian egg having an ovoid shape with a larger end and a smaller end, there being an air cell in the larger end, said egg having an interior membrane under the shell, said membrane encompassing the fluid content of the egg, and failing to enter the air cell, the step of piercing a wall of the egg shell and the membrane by means of a single bent needle having a proximate straight portion, by holding the egg in one hand of the user, said egg being partly exposed, the larger end portion of the egg being toward the palm of the hand, pressing the egg down against the point of the needle held upright with its point up, sliding the egg down on the needle all the way to the end of the needle and abutting the egg against a fixed member so that the entire needle is within the egg and at least partially within the yolk, and the straight portion of the needle extends through the shell and the membrane, and rapidly rotating the needle while the egg is held in the hand until the egg is homogenized.

* * * * *